United States Patent

Torazza

[15] 3,685,504
[45] Aug. 22, 1972

[54] FUEL TANK VENTILATION IN MOTOR VEHICLES

[72] Inventor: Giovanni Torazza, Turin, Italy

[73] Assignee: Fiat Societa Per Azioni, an Italian Joint Stock Company, Turin, Italy

[22] Filed: Nov. 12, 1970

[21] Appl. No.: 88,748

[30] Foreign Application Priority Data

Nov. 14, 1969 Italy...................54032 A/69

[52] U.S. Cl.................123/136, 220/85 VR, 123/121
[51] Int. Cl..............................................F02m 59/00
[58] Field of Search..................123/119 R, 136, 120; 220/85 VR

[56] References Cited

UNITED STATES PATENTS

| 2,414,158 | 1/1947 | Mock.................123/119 R X |
| 3,542,239 | 11/1970 | Latvala.................220/85 VR |
| 3,554,175 | 1/1971 | Sarto..........................123/136 |

Primary Examiner—Laurence M. Goodridge
Attorney—Sughrue, Rothwell, Mion, Zinn & Macpeak

[57] ABSTRACT

A motor vehicle fuel tank having at least two spaced apart holes on its surface with each of the holes being connected to a fuel vapor trap. To prevent liquid fuel from leaving the tank and entering the trap, each hole is controlled by a float valve connected between the hole and the trap.

2 Claims, 4 Drawing Figures

Patented Aug. 22, 1972  3,685,504

FUEL TANK VENTILATION IN MOTOR VEHICLES

This invention relates to the ventilation of the fuel tank of a motor vehicle.

Research on atmospheric pollution has shown that it is highly desirable to prevent the escape of fuel vapor from the tank to the atmosphere. Legislation has been introduced in the United States of America to make it compulsory in certain areas to have a trap preventing the escape of fuel vapor from the tank, and various forms of trapping systems have been proposed.

Among the forms proposed, it is common to have a fuel tank with a plurality of holes in its upper surface, spaced apart from each other so that in any condition of the vehicle during normal driving, and with the tank filled to the maximum, at least one of the holes is free from fuel. All the holes are connected by separate tubes to a container which should be located sufficiently high above the tank to ensure that the container will never be flooded with liquid fuel during normal driving. The container acts as a manifold, being connected by a duct to a trap canister containing a fuel vapor trapping material such as activated carbon. Air is circulated through the canister to draw fuel vapor out of the trap and into the air stream feeding the engine. A valve that is normally closed to the atmosphere is inserted in the system to allow the entry of air from the atmosphere when there is an under-pressure in the tank. The valve also allows gas to escape from the tank to the atmosphere in the event of a dangerous and sudden over-pressure, caused by an event such as collapse of the tank in a collision.

When the vehicle is unused for a substantial period, vapor collects in the trap and is purged by air circulating through it when the engine is next started.

With a vapor trap system such as this, it is essential to prevent fuel in liquid form from reaching the trap since it would render the trapping material useless. For this reason the manifold should be as high as possible above the tank. However, practical considerations set a limit on this height, particularly when the fuel tank is in any event directly below the bonnet of an automobile.

An object of the invention is to alleviate this problem and make it unneccessary to have a tall space above the fuel tank to receive the tubes.

The invention provides a motor vehicle having a fuel tank with a plurality of holes spaced apart in its upper surface, a tube leading from each hole, a fuel vapor trap with which each tube communicates, purging means to pass air through the trap, an engine to which the purging air is fed, and normally closed valve means to control the communication of the tank with the atmosphere; characterized by a valve controlling the flow of fluid through the tube at each hole, the valve permitting the outflow of vapor from the tank but preventing the outflow of liquid fuel.

The valve at each hole is preferably a float valve.

Figure 1:
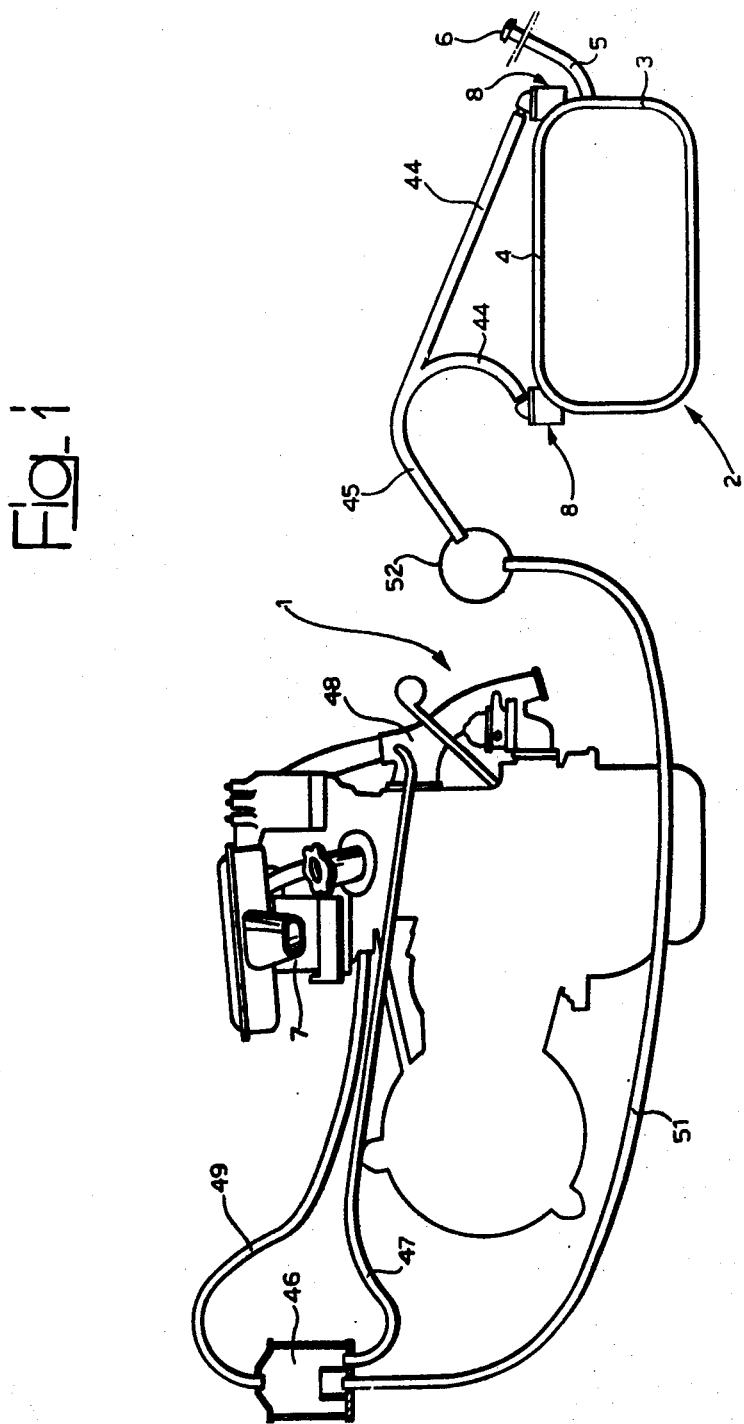
FIG. 1 illustrates diagrammatically arrangements according to the invention for ventilating the fuel tank of a motor vehicle.

In FIG. 1, a motor vehicle has an engine 1 supplied with fuel from a tank 2. The tank is elongated, its axis being substantially horizontal. For filling, the tank has a tube 5 connected to a side wall 3 and closed by an air-tight cap 6. The tank is connected by ducts not shown to a carburetor 7 of the engine.

At opposite ends of the upper surface 4 of the tank 2 are float valves 8 to be described in detail later. Each valve 8 is connected by a branch tube 44 to a tube 45 which leads to a valve 52 of known construction, which admits air from the atmosphere when there is an under-pressure in the tank 2 and which, in cases of a sudden extreme over-pressure in the tank, caused by an event such as a collision crushing the tank, allows vapor from the tank to escape to the atmosphere. For a slight over-pressure in the tank, the valve 52 allows vapor to pass from the tube 45 to a tube 51 leading to a fuel vapor trap 46, also of a known type. The trap 46 contains a vapor-absorbing material such as activated carbon. The trap is connected by a tube 47 to the outlet 48 of an air filter, to allow clean air to enter the trap and purge it. The purging air leaves the trap through a tube 49 which leads to the intake manifold of the carburetor 7.

The valves 8 control holes at the ends of the tank, permitting the outflow of vapor but not of liquid fuel. One hole will be open whatever the inclination or other conditions of the vehicle during normal driving, so that there will always be a passage for vapor from the tank 2 to the trap 46. Liquid fuel, however, cannot pass from the tank.

Figure 2:
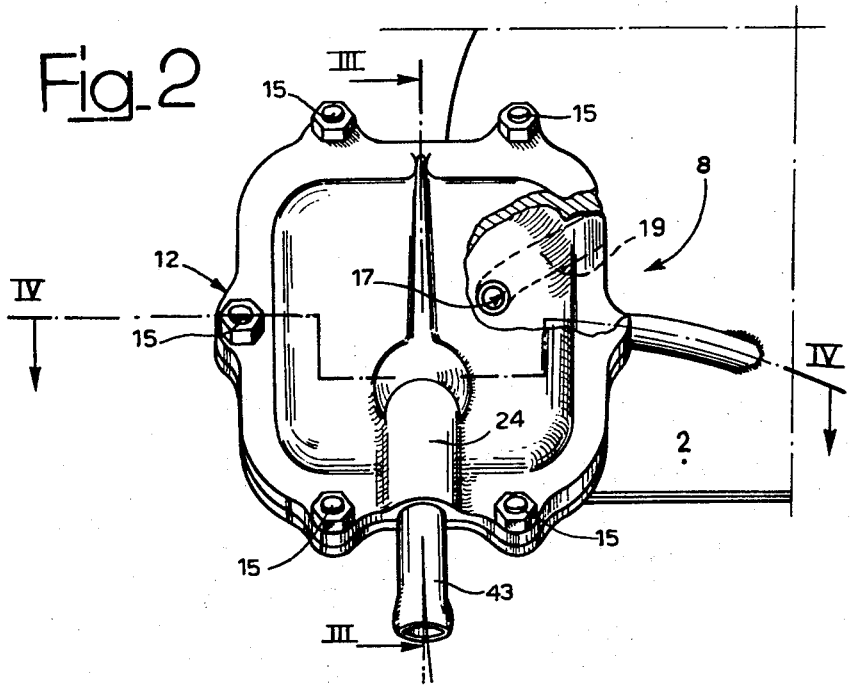
FIG. 2 is a plan view of a detail of FIG. 1.
Figure 3:
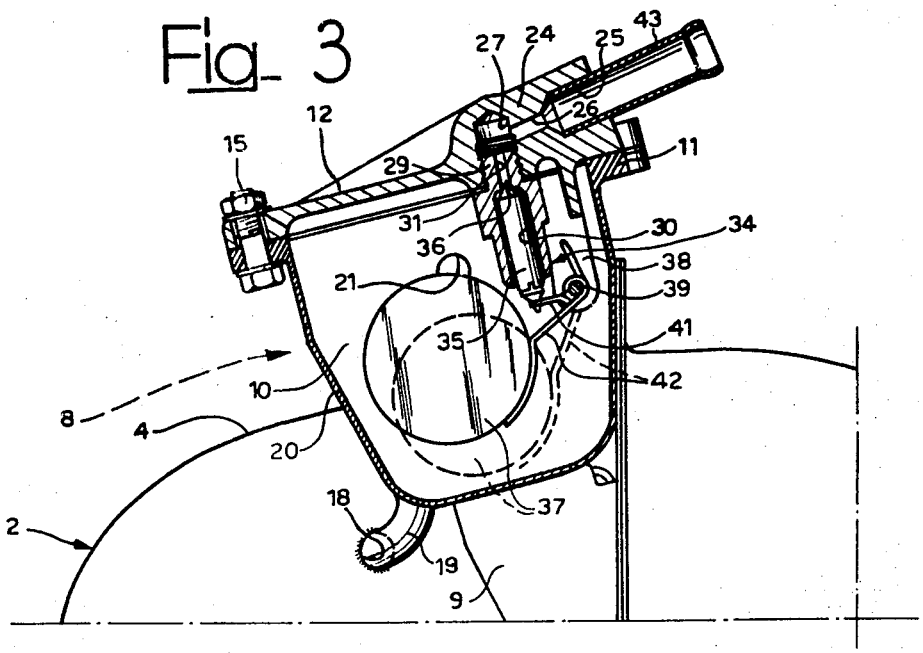
FIG. 3 is a section on the line III—III of FIG. 2.
Figure 4:
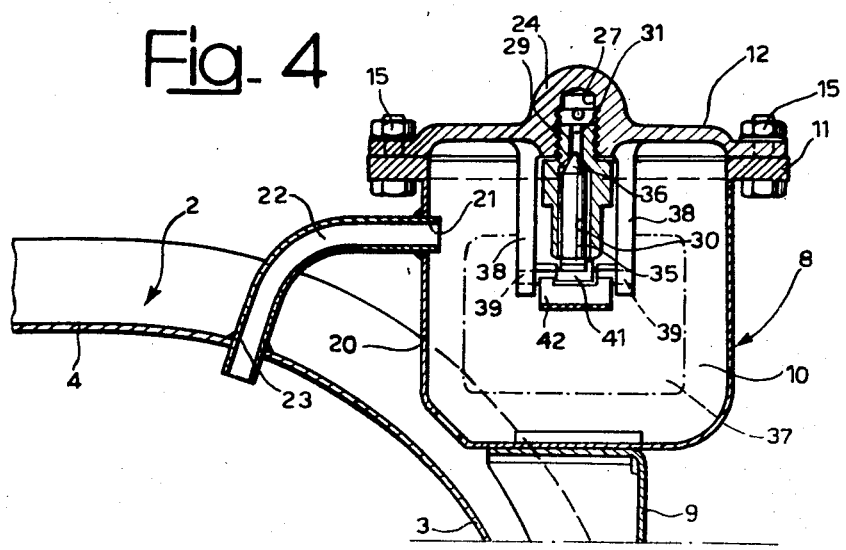
FIG. 4 is a section on the line IV—IV of FIG. 2.

Details of the valves 8 are seen in FIGS. 2 to 4. Each valve 8 is connected to the tank 2 by means of a bracket 9 (FIGS. 3 and 4), and has an interior chamber 10 closed by a cover 12 secured by bolts 15 to a flange 11 on the body of the valve. A lower hole 17 (FIG. 2) in the body of the valve is connected by a tube 19 to a hole 18 (FIG. 3) in the tank. An upper hole 21 (FIG. 4) in the valve body is connected by a tube 22 to a hole 23 in the tank. The tubes 19 and 22 and the holes they interconnect are of small cross-section in order to retard the flow of liquid fuel into the chamber 10.

The cover 12 is substantially horizontal and has a projection 24 on its upper surface with coaxial holes 25 and 26 formed in it. The hole 26 intersects in internally threaded substantially upright hole 27 which extends downwards into the chamber 10. A threaded body 29 is screwed into the hole 27, and is formed with coaxial holes 30 and 31. The holes 30, 31, 27, 26, 25 form a passage passing through the cover 12. This passage is controlled by a closure member 35 in the form of a cylindrical body having an upper conical tip 36. The body 35 slides with radial clearance in the hole 30, the tip 36 closing the hole 31 when the body 35 is in its uppermost position. A float 37 is connected to a lower arm 42 of a rocking lever which is pivoted by a horizontal pin 39 to two lugs 38 projecting downward from the cover 12. An upper arm 41 of the rocking lever is connected to the lower end of the body 35 to move it up and down between a closed and an open position.

A short tube 43 is mounted in the hole 25 on the outside of the cover, and is in turn connected to a tube 44 (FIG. 1) leading vapor away from the tank 2.

Liquid fuel leaving the tank 2 through one of the holes 18, 23 and entering the chamber 10 of either of the valves 8, whether because of a change in the inclination of the vehicle or because of centrifugal or other dynamic forces, will cause the float 37 to rise and consequently cause the closure member 35 to move to its closed position, preventing the liquid from entering the tube 44. The liquid will return to the tank through one of the tubes 19, 22 as soon as normal conditions are restored in the tank. While one of the valves 8 is closed, the other will be open to permit the outflow of vapor.

With the ventilation arrangements of the invention, the tubes 44, 45 can communicate directly with the vapor trap 46 without the need for a container mounted in a raised position to accommodate liquid rising up the tubes from the tank, such a container having been commonly provided in prior systems.

The valves 8 are mounted sufficiently high relatively to the tank 2 that when the vehicle is stationary and not sloping unduly liquid fuel will normally not enter the chambers 10 to raise the floats 37 even when the tank is full.

I claim:

1. A motor vehicle having an elongated fuel tank arranged with its axis substantially horizontal, two holes at each end of the tank in its upper surface, a float valve positioned at each end of the tank adjacent the two holes thereat, the two holes at each end being connected at different vertical levels to a chamber of each float valve, the float valve having a passage controlled by a closure member, the passage being connected by a branch tube to a similar branch tube connected to the float valve at the other end of the tank, the branch tubes being connected to a normally closed control valve which under a slight over-pressure in the tank permits the passage of vapor through the control valve, and which opens to admit air from the atmosphere when there is an under-pressure in the tank, the control valve being connected by a tube to a fuel vapor trap, the trap being connected to a source of filtered air for purging of the trap and being connected to an air intake of the vehicle engine to receive the purging air leaving the trap, the float valves being located at a level above the tank such that the float valves are open when the vehicle is stationary and substantially horizontal, each float valve passage having a substantially vertical portion and the closure member being mounted for movement in a substantially vertical direction in that passage, the float member being attached to an arm of a lever mounted for rocking movement about a substantially horizontal pivot fixed in the chamber of the float valve, the rocking lever having a second arm to which is attached a float member.

2. In a motor vehicle having a liquid fuel tank provided with a vapor ventilation means, a fuel vapor trap connected by a tube to the ventilation means, purging means for passing air through the trap, an engine to which the purging air is fed, and normally closed valve means connected between the ventilation means and the vapor trap to control the communication of the tank with the atmosphere, the improvement in the vapor ventilation means comprising:

a. conduit means connected to openings in the upper wall of the tank in at least two remotely spaced positions, said openings being above the normal maximum level of fuel in the tank when the vehicle is stationary and substantially level;

b. valve means positioned adjacent to each of said openings, each valve means including a valve housing, the interior of each valve housing being connected to one of said conduit means;

c. a vapor outlet passage extending through an upper wall of said housing and connected to said tube;

d. a valve seat in said passage;

e. a valve closure member movable in said passage to abut said seat and close said passage; and f. a float member movably contained in said housing and operatively connected to said valve closure member and located above said normal fuel level, whereby inflow of liquid fuel through each of said conduit means to said housing acts on said float member to close said valve passage to prevent flow of liquid fuel through said tube.

* * * * *